United States Patent [19]

Marr et al.

[11] 4,166,811

[45] Sep. 4, 1979

[54] PIGMENT COMPOSITIONS AND METHODS OF PREPARATION

[75] Inventors: Peter W. Marr; Douglas W. Beattie, both of Willowdale, Canada; James D. Easton, Louisville, Ky.

[73] Assignee: Dominion Colour Company Ltd., Toronto, Canada

[21] Appl. No.: 874,335

[22] Filed: Feb. 1, 1978

[30] Foreign Application Priority Data

Dec. 19, 1977 [CA] Canada .................................. 293330

[51] Int. Cl.$^2$ ........................ C08J 3/00; C08L 93/04; C09C 3/10

[52] U.S. Cl. ............................. 260/27 R; 106/308 M; 260/29.2 UA; 260/29.6 H; 260/42.14; 260/42.57

[58] Field of Search ................. 106/308 M; 260/27 R, 260/29.2 UA, 29.6 H, 42.14, 42.57

[56] References Cited

U.S. PATENT DOCUMENTS

| | | | |
|---|---|---|---|
| 1,431,079 | 10/1922 | Acheson | 106/262 |
| 1,813,371 | 7/1931 | Whatmough | 106/289 |
| 1,832,242 | 11/1931 | Risse et al. | 106/308 F |
| 1,863,332 | 6/1932 | Hailwood et al. | 252/308 |
| 1,984,182 | 12/1934 | Gessler | 106/308 N |
| 1,991,367 | 2/1935 | Beck et al. | 260/42.32 |
| 2,192,954 | 3/1940 | Sloan et al. | 106/262 |
| 2,262,229 | 11/1941 | Giambalvo | 106/308 F |
| 2,291,452 | 7/1942 | Dahlen et al. | 106/308 F |
| 2,379,237 | 6/1945 | Jenkins | 260/37 P |
| 2,386,674 | 10/1945 | Flint et al. | 260/29.6 XA |
| 2,441,090 | 5/1948 | Tegrotenhuis et al. | 260/42.55 |
| 2,479,836 | 8/1949 | Hoback et al. | 260/22 R |
| 2,525,835 | 10/1950 | Schmutzler et al. | 106/308 F |
| 2,613,158 | 10/1952 | Walton et al. | 106/218 |
| 2,613,159 | 10/1952 | Walton et al. | 106/218 |
| 2,613,160 | 10/1952 | Walton et al. | 106/218 |
| 2,658,049 | 11/1953 | Adams | 260/42.55 |
| 2,687,394 | 8/1954 | Somermeyer | 260/42.14 |
| 2,701,211 | 2/1955 | Taylor et al. | 106/198 |
| 2,722,485 | 11/1955 | Jensen et al. | 106/241 |
| 2,769,795 | 11/1956 | Braendle | 260/42.55 |
| 2,941,970 | 6/1960 | Craig | 260/29.6 WQ |
| 2,952,656 | 9/1960 | Zomlefer | 260/42.46 |
| 3,060,145 | 10/1962 | Moscrip | 260/42.54 |
| 3,159,498 | 12/1964 | Davis et al. | 106/308 R |
| 3,215,663 | 11/1965 | Weisberg | 260/42.57 |
| 3,232,899 | 2/1966 | Guziak | 260/42.52 |
| 3,257,351 | 6/1966 | Krans et al. | 260/42.54 |
| 3,360,497 | 12/1967 | Jones et al. | 260/42.55 |
| 3,409,585 | 11/1968 | Hagemeyer et al. | 260/42.14 |
| 3,437,503 | 4/1969 | Massam et al. | 106/308 M |
| 3,462,390 | 8/1969 | Dunn | 260/42.21 |
| 3,470,007 | 9/1969 | Linton | 106/298 |
| 3,586,247 | 6/1971 | Perrins | 241/16 |
| 3,607,337 | 9/1971 | Eisenmenger et al. | 106/288 Q |
| 3,615,812 | 10/1971 | Clark | 106/308 M |
| 3,723,153 | 3/1973 | Nagata et al. | 427/184 |
| 3,755,244 | 8/1973 | Hart | 260/42.21 |
| 3,773,535 | 11/1973 | Burgyan et al. | 106/298 |
| 3,778,287 | 12/1973 | Stansfield et al. | 106/308 M |
| 3,891,572 | 6/1975 | Moody et al. | 106/308 M |
| 3,925,313 | 12/1975 | Kojima et al. | 260/29.2 N |
| 3,925,328 | 12/1975 | Shibahara et al. | 260/27 R |
| 3,935,145 | 1/1976 | Rudolphy | 260/27 R |
| 4,036,652 | 7/1977 | Rothmayer | 106/308 N |

OTHER PUBLICATIONS

Moillet et al., *J. Oil Col. Chem. Assoc.*, 1969, vol. 52, pp. 289–308.

*Primary Examiner*—Ronald W. Griffin
*Attorney, Agent, or Firm*—Robert G. Hirons

[57] ABSTRACT

Easily-dispersible pigment compositions suitable for the coloration of aqueous coating systems are prepared by contacting an aqueous slurry of the pigment with an alkaline solution of an acid resin and acidifying the mixture to insolubilize the resin. A pigment-resin composite is produced in which the pigment particles are effectively coated with the resin. On subsequently contacting the pigment-resin composite with a base, optionally in the vapor phase, the resin is neutralized and the pigment rendered easily dispersible in aqueous coating systems.

13 Claims, No Drawings

PIGMENT COMPOSITIONS AND METHODS OF PREPARATION

FIELD OF THE INVENTION

This invention relates to pigment compositions, and methods for their preparation. More particularly, it relates to pigment compositions for use in aqueous based liquid pigmented materials such as paints and inks, and methods for preparation of such compositions in a readily dispersible form.

BACKGROUND OF THE INVENTION

In the coloration of a liquid composition designed for application to surfaces and drying thereon, it is essential that the pigment should be finely divided and uniformly distributed throughout the liquid composition so that there will be no serious defects caused by incomplete dispersion of the pigment, such as visible specks of undispersed pigment, poor gloss, low tinting strength and impaired film properties. In order to obtain satisfactory dispersion of pigment, in aqueous-based coating compositions, the paint or ink manufacturer has had to resort to grinding the pigment into the system in order to disperse the pigment particles thoroughly. During the normal processes of pigment manufacture, isolation by filtration, drying and milling, pigment particles have a tendency to agglomerate, and their subsequent redispersion can prove difficult and time consuming.

BRIEF DESCRIPTION OF THE PRIOR ART

The problem of pigment dispersion in inks has been studied extensively, in connection with organic solvent based printing inks in particular. One general approach to the problem has been surface treatment of the pigment particles, designed to improve pigment dispersion properties and stability of pigment dispersions. A review of methods used in this surface treatment is presented by Moillet and Plant, *J. Oil Col. Chem. Assoc.* 1969, 52 289–308. However, this does not relate to water based systems which have recently assumed greater importance.

One method which is in common use to break up the agglomerates of pigment particles in solvent and aqueous vehicle systems, is to grind the pigment by milling in the presence of the liquid vehicle. For this purpose, roller mills, sand mills or bead mills may be used. This grinding requires a high expenditure of time and energy. Furthermore, it is not always possible to achieve the optimum fineness of dispersion by such means.

To overcome these difficulties for the coatings manufacturer, some pigment manufacturers supply dispersions of pigment in liquid systems, which are completely compatible with the coating vehicle being pigmented. Such a dispersion can simply be stirred into the coating system using relatively inexpensive mixing equipment. In the case of aqueous based systems these dispersions are prepared by intensively grinding the pigment in an aqueous solution of surface active agents. Such an approach, however, merely shifts the expenditure of energy from the coatings manufacturer to the pigment manufacturer, and does not really solve the problem. Moreover, the relatively large amount of water contained in the aqueous pigment dispersion cannot always be tolerated in the coating composition, particularly where deep shade inks or paints are to be formulated. In addition, the presence of the surface active agents may have an undesirable effect on the final coating, such as impairment of its water resistance. If, for example, a dispersion of the above-mentioned kind is processed in combination with an alkaline, aqueous solution of an acid resin, and applied as a coating to a support and dried to produce an coherent film, the water-resistance of the film is impaired by the presence of the surface active agent which is always hydrophilic. Aqueous pigment dispersions are subject also to the further drawback of storage instability, that is, settling or separation of the constituents, drying-out on exposure to the atmosphere and deterioration of the dispersion if exposed to freezing conditions.

Another approach which has been proposed is to formulate aqueous pigment dispersions with amine-solubilised acid resins instead of conventional surface active agents, and add these to the coating formulation. Provided that a volatile amine is used for solubilising the acid resin, when the coating film dries the amine evaporates and the resin returns to its water insoluble, acidic form and does not adversely effect the water fastness of the coating. The problem of initial dispersion of the pigment in the aqueous vehicle remains, however, as expensive grinding is still required. The problem of storage stability also remains.

To make dry, particulate pigment compositions which are readily dispersible in aqueous coating systems, it has been proposed to prepare an aqueous pigment dispersion using water soluble resins, polymers or surface active agents. The resulting product is then dried and comminuted, or spray dried, to give a powder which is dispersible in water and aqueous coating media, by simple stirring techniques. Such a process is, however, expensive. Furthermore, the presence of the water soluble additive adversely affects the water resistance of the coating.

BRIEF SUMMARY OF THE INVENTION

In the process of the present invention, a pigment preparation having ready dispersibility in aqueous coating systems such as printing inks and paints, is prepared by the process of:

(a) contacting an aqueous slurry of the pigment with an alkaline solution of an acid resin, said resin being insoluble in water when in its acid form, but soluble in water when neutralized;

(b) acidifying the mixture so produced, in order to insolubilize the resin and cause its precipitation onto the pigment particles;

(c) isolating and drying the pigment bearing on the particles thereof insolubilized resin.

In the process according to the invention, the pigment particles, which are water insoluble, are treated with an aqueous resin solution, the resin being one which is soluble in aqueous alkali, but insoluble in aqueous acid. The aqueous mixture of pigment and solubilized resin is then acidified, with the result that the resin converts to its insolubilized, acidic form, becomes insoluble in the aqueous medium and precipitates onto the pigment particles, in effect coating the individual pigment particles with water insoluble resin. The resin-coated pigment can now be removed from the aqueous medium e.g. by filtration or centrifugation, and stored, either as presscake or dry powder ready for use in aqueous coating formulations such as inks or paints. To disperse the pigment in an aqueous medium, it is merely necessary to reconvert the resin, which is coated on the pigment particles, to its water soluble, alkalized form, i.e. by treating it with base. This can be done either by adding the resin-coated pigment particles to an alkaline aqueous medium, or by separately treating the resin-coated pigment particles with a base and then adding the resulting product to an aqueous medium. In either event, it has been found that the pigment can be readily dispersed in the aqueous medium to form the paint or ink, by simple agitation such as high speed mixing, and without the necessity for energy intensive grinding or milling.

DESCRIPTION OF THE PREFERRED EMBODIMENTS

The pigments which can be used in the process of the invention are substantially all those water insoluble, finely divided, particulate pigments which have previously been proposed and used for incorporation in aqueous coating formulations. They can be organic materials or inorganic materials. Examples of organic pigments which may be used include azo pigments, phthalocyanine pigments, heterocyclic pigments for example linear quinacridone, and the like. Examples of inorganic pigments which may be used include chrome yellow, molybdate orange, iron oxides, titanium dioxide, zinc oxide, etc. This process is particularly advantageous in the treatment of those pigments whose manufacture contains a processing step in which the pigment is present as a finely divided aqueous suspension.

The resins which can be used for treating the pigment particles in the process of the present invention must have a water soluble form and a water insoluble form, and must be readily convertible in a reversible manner, between these two forms. Most commonly, such resins are acid resins, having free carboxylic acid groups. Such resins are insoluble in water when in their free acid form, but are soluble in water when neutralized by addition of excess base such as an alkali or alkaline earth metal hydroxide, ammonia or an organic amine. Thus, they will dissolve in aqueous alkaline solutions, but can be precipitated from the solution by acidification thereof. Resins can if desired be resolubilized by a subsequent addition of a base. The suitable resins have an acid number of from about 140 to about 300, and a number average molecular weight of less than 5000.

The preferred resins (or polymers) for use in the present invention are either polymerization resins containing carboxylic acid groups, or resins prepared by Diels-Alder addition of maleic anhydride or fumaric acid to the diene unsaturation of rosin, which may further be partially esterified by a polyol such as glycerol or pentaerythritol. The polymerization resins which are used are carboxylic polymers produced by the copolymerization of $\alpha,\beta$-ethylenically unsaturated monomers, at least one of which contains one or more carboxylic acid or anhydride groups. Typical carboxylic monomers include acrylic acid, methacrylic acid, maleic anhydride, maleic half esters and fumaric acid. Typical comonomers for copolymerization therewith include styrene, $\alpha$-methylstyrene, and other copolymerizable unsaturated aromatic compounds, and aliphatic alkenes such as di-isobutylene and 2,4,4-trimethyl pentene. Optionally, in order to adjust the physical properties of the resins, a third monomer such as methylacrylate, methylmethacrylate or ethylmethacrylate can be copolymerized therein also. Since this resin which is used to aid in pigment dispersion remains as part of the final, film forming resin system in the final ink or paint, it is of course highly desirable that the resin which is chosen should have a high degree of compatibility with the resin which forms the major portion of the film forming constituent of the ink or paint.

As noted, the pigment is initially contacted with the acid resin in its basic, water soluble form. The base which is used for solubilizing the resin prior to contacting the pigment can be substantially any effective, water soluble basic compound, which reacts with the resin acid groups to cause solubilization thereof. It can be an inorganic base such as sodium hydroxide, potassium hydroxide, or the like, or ammonia. Alternatively, it can be an organic base, such as triethylamine. The resin is subsequently reconverted to its acidic, water insoluble form to precipitate on the pigment particles, which are then separated from the liquid medium. Thus, the base which is used for initial solubilization of the resin takes no further part in the coating preparation or formulation. However, in the process of the invention, the resin thus coated on the pigment particles is resolubilized with a base at the time the pigment is dispersed in the aqueous coating formulation. It is preferred that this base used in the resolubilization be a volatile base such as ammonia, morpholine or triethylamine. The neutralized, solubilized resin becomes part of the coating film system in the final product, so that it is preferred that the base be volatile to evaporate from the resin as the resin film applied as a coating dries, to convert the resin back to a water insoluble form in the finished coating.

When the pigment particles, coated with insoluble resin, have been separated from the aqueous treatment medium, they can be handled in a number of different ways in the subsequent steps of the process. This pigment-resin combination shows very good storage stability, so that it can be stored in a dry condition for a substantial period of time prior to use, without significant deterioration. Prior to being added to the final coating vehicle, the resin coated pigment particles can, if desired, be separately treated with a suitable base, to bring the resin into its water soluble form, and then dispersed in the aqueous coating media. This can be achieved by physically mixing a solid or liquid base with the powdered resin-coated pigment, for example sufficient powdered sodium carbonate to neutralise the acid resin can be blended with the coated pigment in a ribbon blender, mikropulveriser, or other such mechanical device. A liquid base such as triethanolamine can be incorporated effectively into the powdered resin-coated pigment by spraying the liquid base from an atomizer into a blending device, e.g. ribbon blender, containing the resin-coated pigment. One specific preferred method for treating the resin-pigment particles with base involves the subjection of the insoluble resin coated pigment particles to a volatile amine in the vapor phase, for example ammonia vapor or morpholine vapor. It has been found that these resins react extremely efficiently and rapidly with such vapor phase amines, to produce the soluble form of the resin.

In the alternative, however, the pigment particles coated with insoluble resin can be stirred into an aqueous solution containing excess base, so as to produce the soluble form of the resin, and leave the pigment particles in a substantially uniform dispersion in the aqueous medium. Then this aqueous dispersion of pigment particles can be added to the aqueous coating formulation vehicle, in which the coating resin is dispersed, to form an even dispersion of pigment particles therein. As a further alternative, the pigment particles coated with the acid resin in its insoluble, acidic form, in the dry state, can be added directly to the coating formulation vehicle, provided that this formulation vehicle contains an excess of base, so as to neutralize and hence solubilize the acid resin. As solubilising bases to be incorporated into the coating vehicle or into the acid-resin containing pigment preparation, there may be used ammonia, or volatile organic bases such as morpholine, triethylamine, dimethyl aminoethanol, diethanolamine, methyl ethanolamine, etc. An important criterion for selecting a solubilizing base is that it should be sufficiently volatile to evaporate from the final coating film of ink or paint so that the acid resin reverts to its water-insoluble free-acid form and thus does not adversely affect the water resistance of the pigmented film. For this reason, the use of alkali metal hydroxides, carbonates, etc., as re-solubilizing bases is less desirable as the acid resin is converted to its alkali-metal salt which is incorporated in the final coating film, always remains water soluble, and may considerably impair the water resistance of the film.

Whichever method of solubilizing base treatment is adopted, it is only necessary to add the pigment particles, in dry form, to the chosen aqueous medium under conditions of shearing agitation, such as high speed mixing, in order to affect the necessary even dispersion of pigment particles. Grinding and milling of the pigment particles into the coating formulation medium, with consequent expenditures of time and energy, is avoided.

The initial treatment of the pigment particles with the resin in its water solubilized form may conveniently be undertaken as the final step in the pigment manufacturing process. In the case of conventional azo pigments, chrome yellows and molybdate orange, where the pigments are precipitated in water as the final stage, the alkaline solution of the acid resin may be incorporated into the pigment slurry resulting from this normal manufacturing procedure. In the alternative, the alkaline solution of the acid resin may be added to one of the alkaline precursors of the pigment, e.g. to an alkaline coupling component in the case of an azo pigment, prior to formation of the pigment slurry. Alternatively, a pigment slurry may be prepared by mixing the pigment presscake or powder obtained from the manufacturing process, into an aqueous slurry by means of high intensity mixers such as the "Cowles" dissolver or "Silverson" turbine agitator, along with the aqueous alkaline solution of the acid resin.

A suitable quantity of acid resin for use in the process lies in the range 5%–100% by weight, based on the weight of pigment, with the preferred range being from about 10% to 50% based on pigment weight. The optimum amount required varies to some extent for each particular pigment, and can readily be determined by simple experiments. Quantities of resin in excess of those required for adequate dispersion of the pigment do not appear to be harmful, but produce no significant advantages.

The pigment preparations made according to the invention are suitable for the coloration of a variety of paint and water based coating compositions including paint and printing ink media, in which they disperse with a minimum of mechanical effort, offering savings in labor and manufacturing costs to the paint and printing ink manufacturers.

Often their use results in enhanced coloring strength in comparison with the untreated pigments from which they are produced.

The invention is illustrated but not limited by the following examples, in which the parts and percentages are by weight unless otherwise stated.

EXAMPLE 1

To an aqueous slurry of Pigment Yellow 14 at 20° C., obtained by tetrazotisation of 25.3 parts of 3.3'-dichlorobenzidine and subsequent coupling with 38.2 parts of acetoaceto-toluidide, there was added sufficient 10% sodium hydroxide solution to raise the pH to 9.0. 165 parts of a 10% solution of Joncryl 67 resin (a copolymer of styrene, methyl methacrylate and acrylic acid), dissolved as its sodium salt, were added over approximately 15 minutes. The suspension was then brought to pH 5.0 by addition of dilute hydrochloric acid in order to precipitate the resin onto the pigment. The suspension was heated to 90° C. to increase flocculation, filtered, washed, and dried at 70° C. to yield approximately 82 parts of a yellow pigment preparation which was powdered in a micropulveriser.

Forty parts of this pigment preparation were subsequently treated on a laboratory high speed blender (e.g. Osterizer) by slowly introducing 2 parts of morpholine, as a fine spray from an atomiser, into the agitated powder. The morpholine was absorbed by the powder and neutralized the acidic resin. The resulting amine-neutralized powder which was stored in a sealed container, demonstrated excellent dispersibility in aqueous coating systems, as exemplified below.

EXAMPLE 1-A

An aqueous solution-acrylic flexographic printing ink vehicle (Vehicle A) was prepared according to the following formulation:

| | |
|---|---|
| 7% of Joncryl 67 Resin | |
| 5% of 10% Ammonia Solution | |
| 5% of Isopropanol | Vehicle A |
| 1.5% of Butyl Cellosolve | |
| 81.5% of Water | |

38 parts of the amine-neutralized pigment preparation from Example 1 were stirred into 80 parts of Vehicle A using a laboratory high speed stirrer (e.g. Cowles disperser). After approximately 10 minutes stirring the pigment was completely dispersed and demonstrated excellent color strength development, superior even to a ball milled dispersion of an untreated version of the same pigment in this vehicle. The water-fastness of an ink film prepared from the product of the invention was excellent.

EXAMPLE 2

100 parts of a presscake of Medium Chrome Yellow (Pigment Yellow 34) containing 50 parts of pigment were vigorously mixed with 250 parts of a 5% solution of Beckacite 2267 Resin (a maleic-modified wood rosin of Acid No. 165–175) dissolved as its sodium salt, at a pH of 11.0 in a high intensity mixer (e.g. an Eppenback mixer). After mixing for 1 hour, the pH of the slurry was adjusted to 5.0 with dilute hydrochloric acid to precipitate the resin onto the pigment. The slurry was then heated to 80° C., filtered, washed, dried and ground to yield approximately 62.5 parts of a powdered yellow pigment preparation.

40 parts of this preparation were introduced into a glass jar equipped with a gas-tight lid. 0.7 parts of morpholine contained in a shallow dish were lowered carefully into the jar so that the dish lay on the surface of the powder. The jar was then sealed. After approximately 48 hours the morpholine had vaporized and the vapor had been absorbed by the pigment preparation, subsequently neutralizing the acidic resin contained therein. 40.7 parts of a yellow amine-neutralized pigment preparation resulted which was readily-dispersible in aqueous coating systems, e.g. Vehicle A, on high speed stirring, exhibiting excellent color strength development and wash-fastness.

EXAMPLE 3

To an aqueous slurry of molybdate orange (C.I. Pigment Red 104) containing 80 parts of pigment prepared by the precipitation of lead nitrate with a mixed solution of sodium chromate, sodium sulphate and sodium molybdate, there was added sufficient dilute sodium hydroxide solution to adjust the pH to 9.0. 200 parts of a 10% solution of Joncryl 67 resin (a copolymer of styrene, methyl methacrylate and acrylic acid) was added over 15 minutes. The suspension was then brought to pH 5.0 by addition of dilute hydrochloric acid to precipitate the resin onto the pigment, heated to 70° C., filtered and washed. The resulting presscake was dried and micropulverised to yield approximately 100 parts of a deep orange pigment preparation.

EXAMPLE 3-A

A aqueous solution-acrylic flexographic printing ink vehicle (Vehicle B) was prepared according to the following formulation:

| | |
|---|---|
| 7% Joncryl 67 Resin | |
| 5% of 10% Ammonia Solution | |
| 2% of Morpholine | |
| 5% of Isopropanol | Vehicle B |
| 1.5% of Butyl Cellosolve | |
| 79.5% of Water | |

Vehicle B differed from Vehicle A in that 2% Morpholine had been incorporated. 36 parts of the organic pigment preparation from Example 3 were high speed stirred into 80 parts of Vehicle B. After approximately 10 minutes stirring, the pigment was completely dispersed, demonstrating color strength development at least equal to a ball milled dispersion of an untreated version of the same pigment in this vehicle.

EXAMPLE 4

120 parts of a Beta-Phthalocyanine Blue (Pigment Blue 15) presscake containing 45 parts of pigment was fluidized by stirring with 50 parts of a 10% solution of SMA-1440 resin (a copolymer of styrene and maleic anhydride) then dispersed by ball milling for 48 hours. The pH of the dispersion was 11.0. After separating from the grinding media, the dispersion was diluted with 800 parts of water then, while stirring, the pH was adjusted to 5.0 to precipitate the resin onto the pigment. The slurry was heated to 80° C. then filtered, washed, dried and ground to yield approximately 50 parts of a blue powdered preparation.

This preparation dispersed readily in Vehicle B on high speed stirring to yield an intense blue coloured ink free from specks of undispersed pigment. An untreated version of the same pigment would not disperse in the vehicle under the same conditions.

EXAMPLE 5

To an aqueous slurry of Pigment Yellow 3 at 20° C., obtained by diazotizing 34.5 parts of p-chloro-o-nitroaniline and subsequent coupling with 42.3 parts of acetoacet-o-chloranilide at pH 4.0-5.0, there was added 88 parts of a 10% solution of Tamol 731 (maleic anhydride polymer with 2,4,4-trimethyl pentene, sodium salt) over approximately 15 minutes. The suspension was then brought to pH 2.0 by addition of dilute hydrochloric acid in order to precipitate the resin onto the pigment. The suspension was heated to 90° C., filtered, washed and dried to yield approximately 87 parts of a yellow pigment preparation which was powdered in a micropulveriser.

EXAMPLE 5-A

An aqueous paper-coating vehicle (Vehicle C) based on poly vinyl acetate was prepared according to the following formulation:

| | |
|---|---|
| 45.0% China Clay | |
| 1.0% Tamol 731 | |
| 0.6% Sodium Hydroxide | |
| 29.0% Vinar 201 Dev. (47% PVA Emulsion - Air Products Ltd. | Vehicle C |
| 24.4% Water | |

2.0 part of the yellow pigment preparation from Example 5 were stirred into 100 parts of Vehicle C. After approximately 5 minutes stirring at about 500 rpm the pigment was completely dispersed in the vehicle. Coatings prepared from the vehicle were coloristically as strong as comparable coatings prepared from an aqueous ball milled dispersion of the same pigment.

EXAMPLE 6

To an aqueous slurry of Pigment Yellow No. 14, obtained by tetrazotisation of 25.3 parts of 3.3'—dichloro benzidine and subsequent coupling with 38.2 parts of acetoacet-$o$-toluidide there were added 65.7 parts of a solution of Tamol 731 (maleic anhydride polymer with 2,4,4-trimethylpentene, sodium salt). The suspension was brought to pH 2.5 by addition of dilute hydrochloric acid in order to precipitate the Tamol 731 onto the pigment, heated up to 90° C., filtered, washed and dried at 70° C. to yield approximately 81 parts of a yellow pigment preparation which was subsequently powdered in a micropulveriser. This pigment preparation dispersed readily in vehicle B on high speed stirring to yield an intense yellow colored ink free from specks of undispersed pigment. An untreated version of the same pigment would not disperse under the same conditions.

What we claim is:

1. Process of preparing an aqueous pigmented composition having pigment particles substantially evenly dispersed therein, which comprises:
    (a) mixing water insoluble pigment particles with an aqueous solution of an organic resin, said resin having an acid form in which it contains free carboxylic acid groups and is substantially insoluble in water, and a salt form produced by treating the acid form thereof with base, said salt form being substantially soluble in water, the resin being readily convertable between its water soluble and water insoluble forms, the acid number of said resin being in the range of 140 to about 300 and the number average molecular weight of said resin being less than 5000;

(b) acidifying the organic resin-pigment particle admixture so as to convert the organic resin to its insoluble form and cause precipitation of the resin from aqueous solution onto the pigment particles to form water insoluble resin-pigment complex particles, and separating said complex particles from the aqueous medium;

(c) treating the resin-pigment complex particles with a volatile base in a quantity sufficient to convert the resin to its water soluble form, and dispersing the solubilized resin-pigment particles, by agitation and without grinding or milling, in an aqueous, film forming resin containing coating formulation, the film forming resin contained in the coating formulation having a high degree of compatibility with the resin of said resin-pigment complex particles.

2. The process of claim 1 wherein the organic resin is selected from polymerization resins prepared by copolymerizing α, β-ethylenically unsaturated monomers, at least one of which contains carboxylic acid or anhydride groups, and resins prepared by Diels-Alder addition of maleic anhydride or fumaric acid to rosin.

3. The process of claim 2, wherein the resin-pigment complex particles are treated with a volatile base capable of evaporation from the solubilized resin after application thereof to a substrate as coating, the volatile base being selected from the group consisting of ammonia, morpholine and triethylamine.

4. The process of claim 2, wherein the organic resin is a copolymer of an unsaturated organic acid selected from acrylic acid and methacrylic acid, with styrene, the styrene being present in major proportion.

5. The process of claim 2, wherein the organic resin is a maleic-modified wood rosin of acid number in the range 140–300.

6. The process of claim 2, wherein the organic resin is a styrene-maleic anhydride copolymer.

7. A process of preparing a water insoluble pigment composition which is readily dispersible, without grinding, in an aqueous coating formulation vehicle, which comprises:

(a) mixing pigment particles with an aqueous solution of an organic resin, said resin having an acid form in which it contains free carboxylic acid groups and is substantially insoluble in water, and a salt form produced by treating the acid form thereof with base, said salt form being substantially soluble in water, the resin being readily convertible between its water soluble and water insoluble forms, the acid number of the resin being in the range from about 140 to about 300 and the number average molecular weight of said resin being less than 5000;

(b) converting the organic resin to its insoluble form by acidification, whilst in admixture with the pigment particles, so as to cause precipitation of the resin from aqueous solution onto the pigment particles to form water insoluble resin-pigment complex particles, and separating said complex particles from the aqueous medium;

(c) treating the resin coated pigment particles with a gaseous base so as to convert the resin to its water soluble form.

8. The process of claim 7 wherein the organic resin is selected from polymerization resins prepared by copolymerizing α,β-ethylenically unsaturated monomers, at least one of which monomers contains carboxylic acid or anhydride groups, and resins prepared by Diels-Alder addition of maleic anhydride or fumaric acid, to rosin.

9. The process of claim 7, wherein the gaseous base is selected from ammonia vapor, morpholine vapor and triethylamine vapor.

10. A process for preparing an aqueous pigmented composition having pigmented particles substantially evenly dispersed therein, which comprises:

mixing, under agitation but without mechanical grinding or milling, an alkaline aqueous coating composition vehicle and a resin-pigment composition, said coating composition vehicle including a film forming resin, said resin-pigment composition comprising water insoluble pigment particles, coated with a water insoluble acid organic resin, said resin being capable of being rendered water soluble by treatment with base, and having an acid number in the range from about 140 to about 300, and a number average molecular weight of less than 5000.

11. A process of preparing a water insoluble pigment composition which is readily dispersible in an aqueous medium upon treatment with a base, without milling or grinding, which comprises:

(a) mixing water insoluble pigment particles with an aqueous solution of an organic resin, said resin having an acid form in which it contains free carboxylic acid groups and is substantially insoluble in water, and a salt form produced by treating the acid form thereof with base, said salt form being substantially soluble in water, the resin being readily convertible between its water soluble and water insoluble forms and said resin having an acid number in the range from about 140 to about 300 and a number average molecular weight of less than 5000;

(b) converting the organic resin to its insoluble form by acidification, whilst in admixture with the pigment particles, so as to cause precipitation of the resin from aqueous solution onto the pigment particles to form water-insoluble resin-pigment complex particles, and separating said complex particles from the aqueous medium;

the resultant complex resin-pigment particles being readily reactable with a base to convert the resin portion thereof to its water soluble form for ready dispersion of the complex particles in aqueous medium.

12. The process of claim 11 wherein the organic resin is a polymerization resin prepared by copolymerizing α,β-ethylenically unsaturated monomers, at least one of which monomers contains carboxylic acid or anhydride groups.

13. The process of claim 11 wherein the organic resin is a resin prepared by Diels-Alder addition of maleic anhydride or fumaric acid, to rosin.

* * * * *